L. W. CHUBB.
ELECTRICAL WINDING.
APPLICATION FILED JULY 12, 1917.

1,264,272.

Patented Apr. 30, 1918.

WITNESSES:
John T. Wurmb
D. C. Davis

INVENTOR
Lewis W. Chubb
BY
Wesley G. Carr
ATTORNEY

UNITED STATES PATENT OFFICE.

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL WINDING.

1,264,272.

Specification of Letters Patent.   Patented Apr. 30, 1918.

Application filed July 12, 1917. Serial No. 180,068.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Electrical Windings, of which the following is a specification.

My invention relates to electrical windings such, for example, as the windings of a transformer and it has for its object to provide means whereby the energy of a structurally discontinuous winding may be uniformly distributed throughout said winding, thus giving electrical continuity and consequent freedom from internal resonant disturbances.

A further object of my invention is to provide means whereby, having fixed the resonant period of a winding, current of such frequency as to produce resonance therein, may be substantially prevented from flowing thereto.

Figure 1:
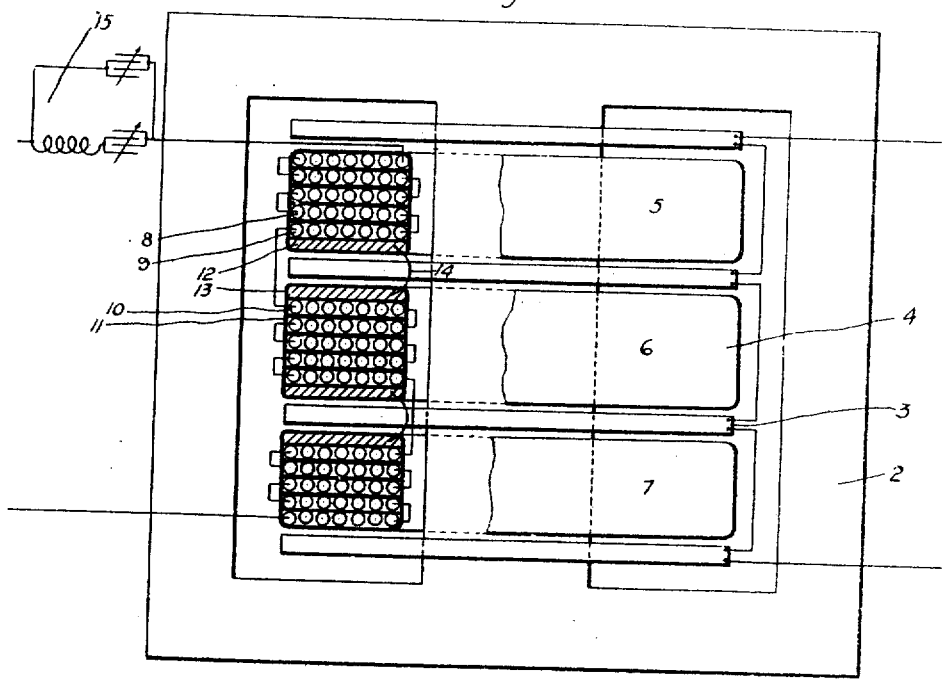
Figure 2:
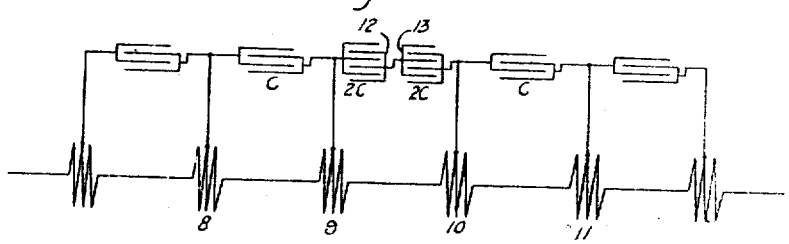

In the accompanying drawing, Figure 1 is a side view, partially in section and partially in elevation, of a transformer, embodying my invention; and Fig. 2 is a diagrammatic view of the circuits of one of the windings in the transformer of Fig. 1, further illustrating my invention.

It is well known that every electrical winding has inherent inductance and capacitance unless especially arranged to eliminate these effects. It, therefore, follows that, for some specific frequency, said winding is resonant and may produce far higher potentials therein than are applied thereto, resulting in disturbance of the circuit and liability to dielectric failure.

If the inductance and capacitance of a winding are uniformly distributed therethrough, said winding will be resonant as a whole and the abnormal potentials are exhibited at the terminals thereof where they may be discharged or otherwise eliminated by suitable protective apparatus.

If, on the other hand, a winding is structurally discontinuous so that either the inductance or capacitance thereof is not uniformly distributed, producing non-uniform energy distribution therein, resonant potentials may be developed within certain portions of the winding without appearing at the terminals thereof. Potentials of this character may be highly disastrous in their effects and yet be extremely difficult to eliminate.

In accordance with my invention, I provide novel means whereby a winding which is structurally discontinuous may be caused to have a substantially uniform energy-distribution therethrough, whereby said winding is resonant as a whole at a predetermined frequency. Having thus determined the frequency of said winding, I preferably connect a parallel resonant circuit in series therewith, said circuit being tuned to said predetermined frequency. Thus, the flow of energy of said frequency to said winding is substantially prevented and the development of resonant potentials is prevented under all conditions.

Referring to the drawing for a more detailed understanding of my invention, I show a transformer core at 2 in Fig. 1, said core carrying two windings 3 and 4. The winding 4 is shown as comprising three groups of flat or pan-cake coils 5, 6 and 7 and the winding 3 is shown as comprising four similar pan-cake coils interspersed therebetween. I have shown my invention only as applied to the winding 4, although it may be equally well applied to the winding 3 and to all windings of a similar nature such, for example, as the field windings of a dynamo-electric machine. The two lower coils of the coil group 5 are designated, respectively, as 8 and 9, and the two upper coils of the coil group 6 are designated, respectively, as 10 and 11. All of the coils of the several groups are shown connected in series relation with each other. There is a relatively high capacitance between the coils 8 and 9 because of their close proximity to each other and because of the high specific inductive capacity of the dielectric therebetween and a similar relatively high capacitance exists between the coils 10 and 11.

The coil groups 5 and 6 are relatively widely spaced apart, however, not only to permit the insertion of a coil of the winding 3 therebetween but, furthermore, to permit the circulation of cooling fluid therebetween. Thus, the capacitance between the coils 9 and 10 is comparatively low, not only on account of the thickness of the dielectric between but, furthermore, on account of the relatively low specific inductive capacity of said dielectric.

With the structure described up to this point, there would be abrupt electrical discontinuity in the winding 4 because of this relatively low capacitance and a consequent liability to the development of resonant potentials within the winding.

In order to prevent the aforementioned action and to render the energy distribution uniform throughout the winding 4, I dispose a layer of conducting material 12 adjacent to the coil 9 and a similar layer of conducting material 13 adjacent to the coil 10. Said layers of conducting material are then connected as by a jumper 14. The coil 9 with the conducting layer 12 thus produces a condenser which is arranged in series with the similar condenser produced by the conducting layer 13 and the coil 10. By causing the capacitance of each of the auxiliary condensers thus provided to be substantially twice that of the condenser produced by two adjacent coils in the same coil group, the resultant capacitance between the coils 9 and 10 may be rendered substantially equal to that between two adjacent coils in the same coil group, in accordance with the well known rule that the joint capacitance of series-connected condensers is the reciprocal of the sum of the reciprocals of the respective capacitance.

Thus, in Fig. 2, the capacitance between the coils 8 and 9 may be designated by C, the capacitance between the coils 10 and 11 by C while the capacitance between the coil 9 and the plate 12 as well as that between the coil 10 and the plate 13 is represented by 2C, thus rendering the equivalent capacitance between the coils 9 and 10 equal to C.

A similar arrangement is provided between the core groups 6 and 7, thus rendering the distribution of energy substantially continuous throughout the winding 4 and causing said winding to be resonant as a whole to a predetermined frequency other than the operating frequency of the transformer. I may then provide a parallel resonant circuit in series with the winding 4 as shown at 15, said parallel resonant circuit being tuned to said predetermined frequency of the winding 4. The flow of current of this frequency into the winding 4 is thereby prevented and the production of abnormal resonant potentials therein is, therefore, substantially prevented under all operating conditions.

While I have shown my invention in one of its preferred forms, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with an electrical winding comprising a plurality of spaced groups of individually spaced coils, the spacing between said groups differing from the spacing between said coils, of means for rendering the capacitance between the immediately adjacent coils of two adjacent groups substantially equal to that between two adjacent coils of a group.

2. The combination with an electrical winding comprising a plurality of spaced groups of individually spaced coils, the spacing between said groups differing from the spacing between said coils, of means for providing a condenser having an end coil of one group as one plate thereof, means providing an additional condenser having the immediately adjacent coil of the neighboring group as one plate thereof, and means for connecting said two condensers in series relation.

3. The combination with an electrical winding comprising a plurality of spaced groups of individually spaced coils, the spacing between said groups differing from the spacing between said coils, of means for providing a condenser having an end coil of one group as one plate thereof, means providing an additional condenser having the immediately adjacent coil of the neighboring group as one plate thereof, and means for connecting said two condensers in series relation, the joint capacitance of said two condensers in series being substantially the same as that between two adjacent coils in the same group.

4. The combination with an electrical winding comprising a plurality of spaced groups of individually spaced coils, the spacing between said groups differing from the spacing between said coils, of a layer of conducting material mounted adjacent to an end coil in one group, an additional layer of conducting material mounted adjacent to the immediately adjacent end coil of the next group, and conducting means between said two conducting layers.

5. The combination with an electrical winding comprising a plurality of spaced groups of individually spaced coils, the spacing between said groups differing from the spacing between said coils, of a layer of conducting material mounted adjacent to an end coil in one group, an additional layer of conducting material mounted adjacent to the immediately adjacent end coil of the next group, and conducting means between said two conducting layers.

6. The combination with a structurally discontinuous electrical winding, of means for rendering said winding electrically continuous, whereby said winding tends to resonate as a whole at a specific frequency, a source of variable frequency connected thereto and a parallel resonant circuit tuned to said specific frequency and connected in circuit with said source and said winding, whereby currents of said specific frequency are prevented from reaching said winding.

7. The combination with a winding adapted to be resonant only at a predetermined frequency, of a source of energy of variable frequency connected thereto, and means inserted in circuit with said winding and adapted to prevent the flow of energy of said predetermined frequency to said winding.

8. The combination with a structurally discontinuous electrical winding, of means for rendering said winding electrically continuous, whereby said winding tends to resonate as a whole at a specific frequency, a source of variable frequency connected thereto and means in circuit with said winding arranged to prevent the flow of energy of said specific frequency thereto.

9. The combination with an electrical winding comprising a plurality of unequally spaced coils, of inter-connected conducting plates adjacent to certain of said coils, whereby the mutual capacitance between each adjacent pair of coils is in proportion to the inductance thereof and said winding is adapted to be resonant, as a whole, to a predetermined frequency, and means in circuit with said coil adapted to prevent the flow of energy of said predetermined frequency thereto.

In testimony whereof, I have hereunto subscribed my name this 30th day of June, 1917.

LEWIS W. CHUBB.